(12) United States Patent
Holmström et al.

(10) Patent No.: US 11,290,333 B2
(45) Date of Patent: Mar. 29, 2022

(54) QUALITY OF SERVICE DIFFERENTIATION BETWEEN NETWORK SLICES

(71) Applicant: Telefonaktiebolaget LM Ericsson (publ), Stockholm (SE)

(72) Inventors: Jarl Tomas Holmström, Dalby (SE); Peter Hedman, Helsingborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 16/334,804

(22) PCT Filed: Sep. 29, 2016

(86) PCT No.: PCT/EP2016/073226
§ 371 (c)(1),
(2) Date: Mar. 20, 2019

(87) PCT Pub. No.: WO2018/059689
PCT Pub. Date: Apr. 5, 2018

(65) Prior Publication Data
US 2019/0238413 A1    Aug. 1, 2019

(51) Int. Cl.
*H04L 12/24* (2006.01)
*H04W 28/24* (2009.01)
(Continued)

(52) U.S. Cl.
CPC ...... *H04L 41/0893* (2013.01); *H04L 41/0836* (2013.01); *H04L 47/2491* (2013.01);
(Continued)

(58) Field of Classification Search
CPC ............. H04L 41/0893; H04L 41/0836; H04L 47/2491; H04L 41/0823; H04W 28/24; H04W 72/10
See application file for complete search history.

(56) References Cited

U.S. PATENT DOCUMENTS

| | | | |
|---|---|---|---|
| 2004/0158644 A1* | 8/2004 | Albuquerque | ...... H04L 41/0896 709/238 |
| 2005/0105560 A1* | 5/2005 | Mann | ...................... H04L 45/28 370/503 |

(Continued)

OTHER PUBLICATIONS

I. da Silva et al., "Impact of network slicing on 5G Radio Access Networks," 2016 European Conference on Networks and Communications (EuCNC), 2016, pp. 153-157, doi: 10.1109/EuCNC.2016.7561023 (Year: 2016).*

(Continued)

*Primary Examiner* — Ayaz R Sheikh
*Assistant Examiner* — Tarell A Hampton
(74) *Attorney, Agent, or Firm* — Coats + Bennett, PLLC (57) ABSTRACT

There is provided mechanisms for quality of service differentiation between network slices. A method is performed by a prioritization entity. The method comprises obtaining relative priority values for the network slices from a network entity. The method comprises providing an access network entity with a relative priority value for a protocol data unit (PDU) flow as given by the relative priority value for the network slice used by that PDU flow, thereby causing differentiation of the quality of service for the network slices.

13 Claims, 5 Drawing Sheets

(51) Int. Cl.
    *H04L 12/857*     (2013.01)
    *H04W 72/10*     (2009.01)
    *H04L 41/0893*     (2022.01)
    *H04L 41/0823*     (2022.01)
    *H04L 47/2491*     (2022.01)

(52) U.S. Cl.
    CPC ......... *H04W 28/24* (2013.01); *H04L 41/0823* (2013.01); *H04W 72/10* (2013.01)

(56) References Cited

U.S. PATENT DOCUMENTS

| | | | | |
|---|---|---|---|---|
| 2011/0195716 A1* | 8/2011 | Hapsari | ................ | H04W 36/02 455/436 |
| 2012/0155264 A1* | 6/2012 | Sharma | ............... | H04L 43/0852 370/232 |
| 2012/0314568 A1* | 12/2012 | Tan | ....................... | H04W 12/08 370/230 |
| 2015/0154258 A1* | 6/2015 | Xiong | ............... | G06F 16/24542 707/718 |
| 2015/0365273 A1* | 12/2015 | Cabrera | ................. | H04L 47/74 370/254 |
| 2016/0080531 A1* | 3/2016 | Agiwal | .................. | H04L 69/22 370/474 |
| 2016/0212654 A1* | 7/2016 | Itoh | ...................... | H04W 40/12 |
| 2016/0353422 A1* | 12/2016 | Vrzic | .................... | H04W 16/04 |
| 2016/0353465 A1* | 12/2016 | Vrzic | ................ | H04W 28/0247 |
| 2017/0086118 A1* | 3/2017 | Vrzic | .................... | H04W 36/26 |
| 2018/0007552 A1* | 1/2018 | Bae | ................ | H04W 12/04033 |
| 2018/0014222 A1* | 1/2018 | Song | ................ | H04W 28/0268 |
| 2018/0048465 A1* | 2/2018 | Schliwa-Bertling | ........................ | H04L 9/0662 |
| 2018/0124854 A1* | 5/2018 | Myhre | .................. | H04W 76/10 |
| 2018/0206152 A1* | 7/2018 | Zhang | ................... | H04M 15/66 |
| 2019/0021047 A1* | 1/2019 | Zong | .................... | H04W 48/00 |
| 2019/0037409 A1* | 1/2019 | Wang | .................... | H04W 88/14 |
| 2019/0132781 A1* | 5/2019 | Arnold | ............. | H04W 72/0446 |
| 2019/0140904 A1* | 5/2019 | Huang | ................ | H04L 41/0806 |
| 2019/0174498 A1* | 6/2019 | Samdanis | ......... | H04W 72/0453 |
| 2019/0223054 A1* | 7/2019 | Nunna | ........... | H04W 28/0268 |

OTHER PUBLICATIONS

M. Jiang, M. Condoluci and T. Mahmoodi, "Network slicing management & prioritization in 5G mobile systems," European Wireless 2016; 22th European Wireless Conference, 2016, pp. 1-6. (Year: 2016).*

Ericsson, "Impacts of NW Slice awareness to RAN signalling", 3GPP TSG-RAN WG3 NR Ad Hoc, Jan. 16-20, 2017, pp. 1-4, Spokane, WA, US, R3-170193.

Etri, "Update the solution 6.2.1.1: Relation between PDU Flow and Service Data Flow", SA WG2 Meeting #116, Jul. 11-15, 2016, pp. 1-4, Vienna, Austria, S2-163520.

* cited by examiner

QUALITY OF SERVICE DIFFERENTIATION BETWEEN NETWORK SLICES

TECHNICAL FIELD

Embodiments presented herein relate to a method, a prioritization entity, a computer program, and a computer program product for quality of service differentiation between network slices. Embodiments presented herein further relate to a method, an access network entity, a computer program, and a computer program product for quality of service differentiation between network slices.

BACKGROUND

In communications networks, there may be a challenge to obtain good performance and capacity for a given communications protocol, its parameters and the physical environment in which the communications network is deployed.

For example, so-called Dedicated Core Networks (DCN) are supported by the 3rd generation partnership project (3GPP) and described in 3GPP TS 23.401. Each Core Network can be configured to support scenario specific characteristics.

The concept of Network Slicing is similar to that of DCNs. For Network Slicing each Core Network Instance is configured to support scenario specific characteristics. Examples of such scenarios are Mobile Broadband with Voice over packet bearers (MBB/Voice), Critical machine type communications (MTC) and Massive MTC.

Some aspects of these scenarios will be disclosed next. The MBB/Voice scenario requires high bitrates for the MBB part and a guaranteed bitrate with limited delay variation for the Voice part, but it is assumed that a user could accept connection failures and call drops as long as the connection works again after a re-try. The critical MTC scenario is more sensitive to reliability; although the communication service might not be frequently used it must function when it is needed and then provide reliable communication. In the Massive MTC scenario there are typically a very large number of served devices that could be dormant for long periods and then active for a short period. In this scenario the communications network needs to be able to handle activity bursts when large number of devices are using the communication service more or less all at the same time.

Further, there may be several instances of each Network Slice for different ones of the above disclosed scenarios. For example, one Network Slice instance could be created for a large enterprise or a large MTC service provider whereas other MTC service providers share one common Network Slice instance created for Massive MTC purposes.

According to 3GPP TS 23.401 each evolved packet core (EPS) bearer is associated with the bearer level Quality of Service (QoS) parameters denoted QoS Class Identifier (QCI) and Allocation and Retention Priority (ARP). Each guaranteed bit rate (GBR) bearer is additionally associated with the parameters GBR and Maximum Bit Rate (MBR).

According to 3GPP TS 23.401 QCI is a scalar-valued parameter that is used as a reference to access node-specific parameters that control bearer level packet forwarding treatment (e.g. scheduling weights, admission thresholds, queue management thresholds, link layer protocol configuration, etc.), and that have been pre-configured by the operator owning the access node.

The access network receives information about QCI and ARP for each activated radio bearer and served wireless terminal from the core network. This information is stored in the access network during the lifetime of the radio bearer. The number of standardized QCIs is currently limited; if no additional QCIs are defined there is hence a need to re-use the existing ones in all network slices.

Protocol data units (PDUs) targeted for different network slices could be associated with the same QCI and ARP, governed by the user traffic characteristics. Still they may need different handling in the access network since there could be a need for the network operator to prioritize between traffic belonging to different network slices although the traffic streams have the same characteristics.

Hence, there is a need for an improved handling of quality of service information.

SUMMARY

An object of embodiments herein is to provide efficient quality of service differentiation between network slices.

According to a first aspect there is presented a method for quality of service differentiation between network slices. The method is performed by a prioritization entity. The method comprises obtaining relative priority values for the network slices from a network entity. The method comprises providing an access network entity with a relative priority value for a protocol data unit (PDU) flow as given by the relative priority value for the network slice used by that PDU flow, thereby causing differentiation of the quality of service for the network slices.

According to a second aspect there is presented a prioritization entity for quality of service differentiation between network slices. The prioritization entity comprises processing circuitry. The processing circuitry is configured to cause the prioritization entity to obtain relative priority values for the network slices from a network entity. The processing circuitry is configured to cause the prioritization entity to provide an access network entity with a relative priority value for a PDU flow as given by the relative priority value for the network slice used by that PDU flow, thereby causing differentiation of the quality of service for the network slices.

According to a third aspect there is presented a prioritization entity for quality of service differentiation between network slices. The prioritization entity comprises processing circuitry and a storage medium. The storage medium stores instructions that, when executed by the processing circuitry, causes the prioritization entity to perform operations, or steps. The operations, or steps, cause the prioritization entity to obtain relative priority values for the network slices from a network entity. The operations, or steps, cause the prioritization entity to provide an access network entity with a relative priority value for a PDU flow as given by the relative priority value for the network slice used by that PDU flow, thereby causing differentiation of the quality of service for the network slices.

According to a fourth aspect there is presented a prioritization entity for quality of service differentiation between network slices. The prioritization entity comprises an obtain module configured to obtain relative priority to values for the network slices from a network entity. The prioritization entity comprises a provide module configured to provide an access network entity with a relative priority value for a PDU flow as given by the relative priority value for the network slice used by that PDU flow, thereby causing differentiation of the quality of service for the network slices.

According to a fifth aspect there is presented a computer program for quality of service differentiation between network slices, the computer program comprising computer program code which, when run on processing circuitry of a prioritization entity, causes the prioritization entity to perform a method according to the first aspect.

According to a sixth aspect there is presented a method for quality of service differentiation between network slices. The method is performed by an access network entity. The method comprises providing service for a PDU flow of one of the network slices. The method comprises obtaining a relative priority value for the PDU flow from a prioritization entity. The method comprises obtaining a quality of service class identifier for the PDU flow. The method comprises prioritizing the PDU flow in relation to other PDU flows for which the access network entity provides service according to the relative priority value and the quality of service class identifier, thereby differentiating the quality of service for the network slices.

According to a seventh aspect there is presented an access network entity for quality of service differentiation between network slices. The access network entity comprises processing circuitry. The processing circuitry is configured to cause the access network entity to provide service for a PDU flow of one of the network slices. The processing circuitry is configured to cause the access network entity to obtain a relative priority value for the PDU flow from a prioritization entity. The processing circuitry is configured to cause the access network entity to obtain a quality of service class identifier for the PDU flow. The processing circuitry is configured to cause the access network entity to prioritize the PDU flow in relation to other PDU flows for which the access network entity provides service according to the relative priority value and the quality of service class identifier, thereby differentiating the quality of service for the network slices.

According to an eighth aspect there is presented an access network entity for quality of service differentiation between network slices. The access network entity comprises processing circuitry and a storage medium. The storage medium stores instructions that, when executed by the processing circuitry, causes the access network entity to perform operations, or steps. The operations, or steps, cause the access network entity to provide service for a PDU flow of one of the network slices. The operations, or steps, cause the access network entity to obtain a relative priority value for the PDU flow from a prioritization entity. The operations, or steps, cause the access network entity to obtain a quality of service class identifier for the PDU flow. The operations, or steps, cause the access network entity to prioritize the PDU flow in relation to other PDU flows for which the access network entity provides service according to the relative priority value and the quality of service class identifier, thereby differentiating the quality of service for the network slices.

According to a ninth aspect there is presented an access network entity for quality of service differentiation between network slices. The access network entity comprises a provide module configured to provide service for a PDU flow of one of the network slices. The access network entity comprises an obtain module configured to obtain a relative priority value for the PDU flow from a prioritization entity. The access network entity comprises an obtain module configured to obtain a quality of service class identifier for the PDU flow. The access network entity comprises a prioritize module configured to prioritize the PDU flow in relation to other PDU flows for which the access network entity provides service according to the relative priority value and the quality of service class identifier, thereby differentiating the quality of service for the network slices.

According to a tenth aspect there is presented a computer program for quality of service differentiation between network slices, the computer program comprising computer program code which, when run on processing circuitry of an access network entity, causes the access network entity to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these prioritization entities, these access network entities, and these computer programs provide efficient quality of service differentiation between network slices. In turn this enables efficient handling of quality of service information.

Advantageously these methods, these prioritization entities, these access network entities, and these computer programs allow each network slice to use the QoS concept in isolation; each network slice is enabled to use the QoS parameter values appropriate for the user traffic characteristics without having to consider the relative priority of the network slice. Parameter values can thus be re-used between network slices. The QoS parameters could be e.g. QCIs together with ARP, GBR and MBR, and/or where e.g. the scheduling priority could be a separate QoS parameter.

Advantageously these methods, these prioritization entities, these access network entities, and these computer programs remove the need to define operator- and Network slice specific QCIs or QoS information. For example, if several network slices each have a bearer for buffered streaming video and the network operator would like to give different priority to some of the network slices for this traffic these methods, these prioritization entities, these access network entities, and these computer programs enable all network slices to still use the same QCI value.

Advantageously these methods, these prioritization entities, these access network entities, and these computer programs remove the need for reconfiguration of individual network slices if a new network slice is added that is supposed to have a priority somewhere in-between the priorities of existing network slices.

Advantageously these methods, these prioritization entities, these access network entities, and these computer programs enable the network operator to control the relative priority between network slices and by that the relative priority between services offered to different service providers.

Advantageously these methods, these prioritization entities, these access network entities, and these computer programs enables isolation to be maintained between different network slices since the relative priority between traffic of the same type in the different network slices could be hidden and known only by the network operator.

Advantageously these methods, these prioritization entities, these access network entities, and these computer programs are applicable to QoS aware network architectures using network slicing and a common resource like an access network.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
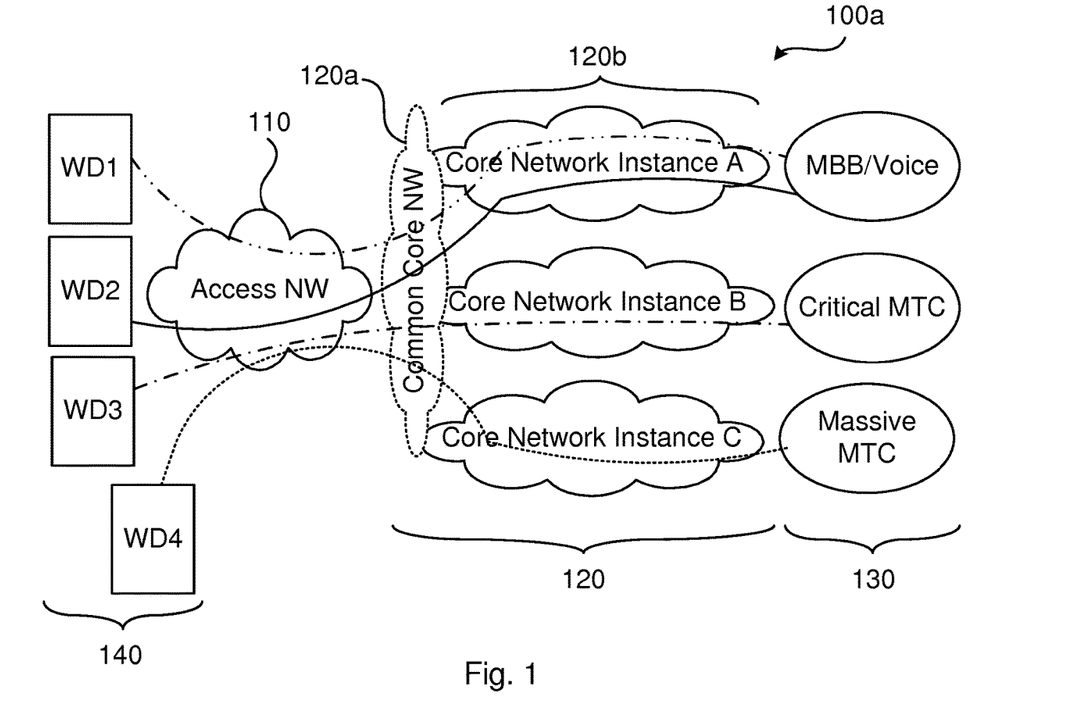
FIGS. 1, 2, and 3 are schematic diagrams illustrating communications networks according to embodiments.

FIG. 1 is a schematic diagram illustrating a communications network 100a where embodiments presented herein can be applied. The communications network 100a comprises an access network (NW) 110, a core network 120, and a service network 130. The access network is configured to provide wireless network access to services (such as MBB/Voice, Critical MTC and Massive MTC) of the service network for wireless devices (WD) 140. The access network in turn comprises access nodes and entities. The core network is operationally divided between a common core network 120a and core network instances 120b, in FIG. 1 denoted "Core Network Instance A", "Core Network Instance B" and "Core Network Instance C", one for each type of service, and comprises core network nodes and entities.

It is assumed that the wireless devices communicate with the service network using flows of protocol data units (PDUs), hereinafter denoted PDU flows. It could be that the access network needs to prioritize between handling different such PDU flows. The core network could request QoS authorization for protocol data unit (PDU) flows rather than for bearers. The bearer setup could be replaced by a PDU session setup. Equivalent QoS parameters may be used, where e.g. the scheduling priority may be a separate parameter.

Issues with current mechanisms for handling prioritization information were disclosed above. In further detail, prioritization based only on QCI values cannot be satisfied with the current number of standardized QCIs and one possible option is to define more QCIs, e.g. multiple QCIs per traffic characteristics type. As an example QCI=4 [Non-Conversational Video (Buffered Streaming)] could be expanded to a proprietary QCI range 40-49, where each of those would be used for the same traffic type but get different handling in the access network. There are some drawbacks with this approach; the number of possible values for each traffic characteristics type is limited and some values are already assigned. Another issue is that each network slice would have to be configured with its own set of slice-specific QCIs. With this approach there will be a large number of non-standardized QCIs to handle, possibly different for each network operator. Addition of a network slice, with relative priority in-between existing network slices, may trigger a need to reconfigure QoS, i.e. which QCIs to use, in all existing network slices. To overcome the drawbacks caused by proprietary values, the added QCIs could also be standardized, creating a larger, but still limited, set of well-known values, used throughout all networks. This would however impact the degree of isolation between network slices since the obtained relative priority of a network slice would be known to each network slice subscriber, and this might not be desirable from a network operator perspective.

The embodiments disclosed herein thus relate to mechanisms for quality of service differentiation between network slices and quality of service differentiation between network slices. In order to obtain such mechanisms there is provided a prioritization entity 200, a method performed by the prioritization entity 200, a computer program product comprising code, for example in the form of a computer program, that when run on processing circuitry of the prioritization entity 200, causes the prioritization entity 200 to perform the method. In order to obtain such mechanisms there is further provided an access network entity 300, a method performed by the access network entity 300, and a computer program product comprising code, for example in the form of a computer program, that when run on processing circuitry of the access network entity 300, causes the access network entity 300 to perform the method.

Figure 2:
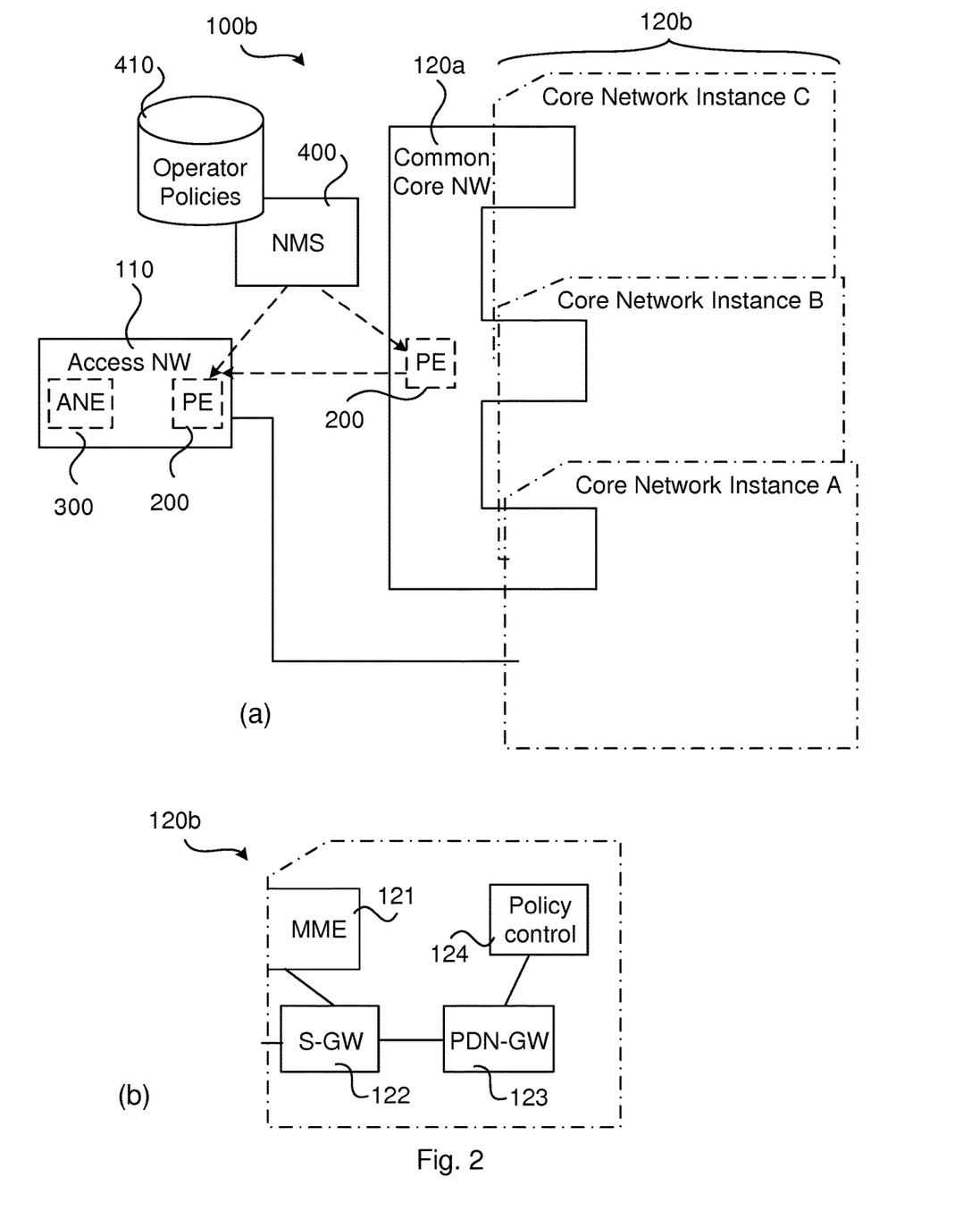

FIG. 2(a) is a schematic diagram illustrating a communications network 100b showing parts of the communications network 100a in FIG. 1 and where embodiments presented herein can be applied. The communications network 100b illustrates the access network, common core network, and core network instances of the communications network 100a in FIG. 1 in further detail. An access network entity 300 is illustrated as part of the access network 110. The access network entity (ANE) 300 could be part of an access node as disclosed above. Further aspects of the access network entity 300 will be described below. At least one of the common core network 120a and the access network comprises a prioritization entity (PE) 200. The prioritization entity 200 is operatively connected to a network management system 400 which in turn is operatively connected to, or co-located with, a operator policies database 410. The prioritization entity 200 is provisioned from a network management system with information on the relative priority between network slices. The provisioned information is based on operator policies applicable to the connected network slices. This enables efficient handling of prioritization information. The prioritization entity 200 will be further described below.

FIG. 2(b) illustrates a core network instance 120b in more detail. The core network instance comprises a Mobility Management Entity (MME) 121, a Serving Gateway (S-GW) 122, a packet data network gateway (PDN-GW) 123 and a policy control 124 entities, each configured operations known to the person of ordinary skill in the art.

Figure 3:
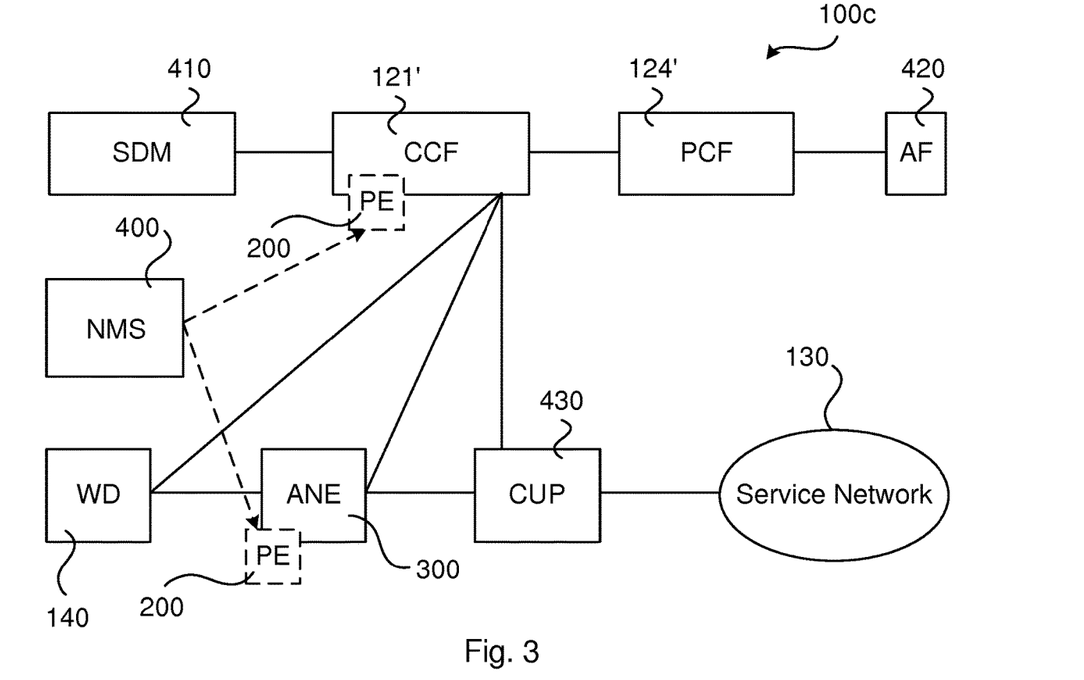

FIG. 3 is a schematic diagram illustrating a communications network 100c showing parts of the communications network 100a in FIG. 1 and where embodiments presented herein can be applied. The communications network 100c is similar to that of FIG. 2 with the MME replaced with a Core network Control Function (CCF) 121'. In a network architecture such as in FIG. 3 the core network could request QoS authorization for PDU flows in PDU sessions rather than for certain bearers as in a network architecture such as in FIG. 2. In addition to the entities of the communications network 100b of FIG. 2, the communications network 100c comprises a Subscriber Data Management (SDM) 410, where the SDM is a network entity that contains subscriber data information, a Policy Control plane Function (PCF) similar to the policy control entity 124, where the PCF is a network entity that contains operator policies, an application layer function (AF) 420, where the AF is an entity that interacts with the Core Network, e.g. provided as an application server requesting QoS differentiation for a service via the PCF, and a Core User Plane function (CUP) 430, where the CUP is a network entity that handles the user data packet flow, e.g. data encapsulation, packet counting, etc.

Figure 4:
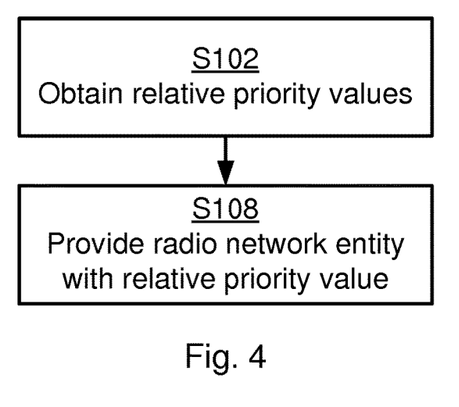
FIGS. 4, 5, 6, and 7 are flowcharts of methods according to embodiments.
Figure 5:
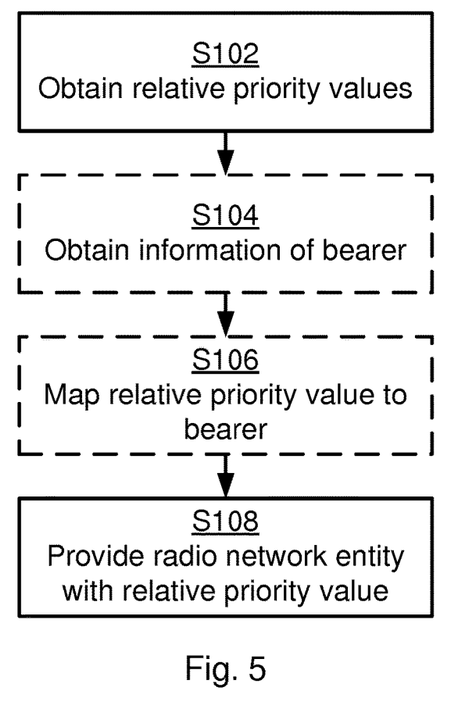
Figure 6:
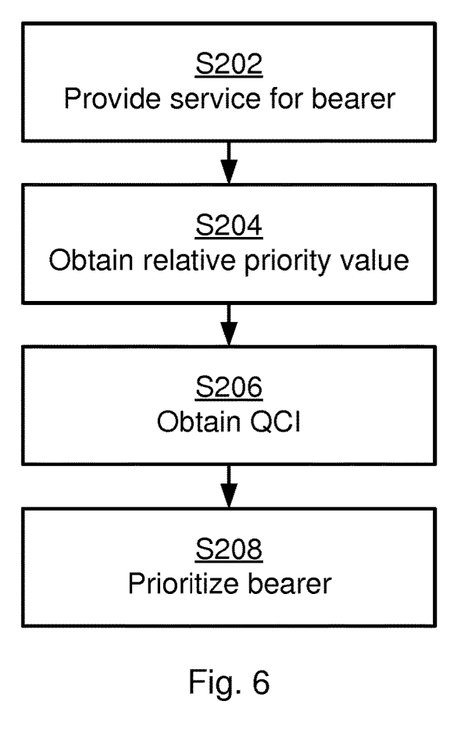

FIGS. 4 and 5 are flow charts illustrating embodiments of methods for quality of service differentiation between network slices as performed by the prioritization entity 200. FIG. 6 is a flow chart illustrating an embodiment of a method for quality of service differentiation between network slices as performed by the access network entity 300. The methods are advantageously provided as computer programs 1220a, 1220b.

Reference is now made to FIG. 4 illustrating a method for quality of service differentiation between network slices as performed by the prioritization entity 200 according to an embodiment.

The slice prioritization entity 200 is provisioned from a network entity, such as the network management system 400 or the PCF entity (via the CCF) entity with QoS related information for the connected network slices, e.g. the relative priority between the network slices. Hence the prioritization entity 200 is configured to perform step S102:

S102: The prioritization entity 200 obtains relative priority values for the network slices from the network entity.

The provisioned information could be based on operator policies applicable to the access network and the connected network slices.

Relative priority values for PDU flows as given by the relative priority values are then provided by the prioritization entity 200 to the access network entity 300. Hence the prioritization entity 200 is configured to perform step S108:

S108: The prioritization entity 200 provides the access network entity 300 with a relative priority value for a PDU flow as given by the relative priority value for the network slice used by that PDU flow, thereby causing differentiation of the quality of service for the network slices.

The access network entity 300 is thereby configured with information on how to differentiate traffic to/from the connected network slices so that individual network slices do not need to be configured and/or aware of how the network slice is handled/prioritized compare to other network slices.

This method for quality of service differentiation enables bearer QoS for individual network slices to be set based solely upon characteristics of the user traffic carried on the different bearers. That is, reconfigurations of relative priorities between network slices connected to an access network served by the access network entity 300 do not affect QoS management within the different connected network slices.

Embodiments relating to further details of quality of service differentiation between network slices as performed by the prioritization entity 200 will now be disclosed.

Reference is now made to FIG. 5 illustrating methods for quality of service differentiation between network slices as performed by the prioritization entity 200 according to further embodiments. It is assumed that steps S102 and S108 are performed as described above with reference to FIG. 4 and a thus repeated description thereof is therefore omitted.

There may be different ways for the prioritization entity 200 to obtain the relative priority values in step S102. According to an embodiment the relative priority values are based on network operator policies applicable to those of the network slices that are available. That is, network slices that are activated in the network configuration. According to an embodiment the relative priority values are obtained from the network entity as quality of service information for the network slices. Further, the prioritization entity 200 could obtain knowledge, for example via signaling during bearer setup or provisioning, about to which network slice a specific bearer belongs. Hence, according to an embodiment the prioritization entity 200 is configured to perform step S104:

S104: The prioritization entity 200 obtains information of which one of the network slices the PDU flows belongs to during setup of a bearer for the PDU flow, during setup of tunneling of the bearer, during setup of a PDU session, or during provisioning of the bearer.

Once the prioritization entity 200 has obtained the information it could associate the relative priority value for the network slice to the PDU flow. Hence, according to the embodiment where step S104 is performed, the prioritization entity 200 is configured to perform step S106:

S106: The prioritization entity 200 maps the relative priority value for the network slice to the PDU flow based on the information.

According to an embodiment the relative priority value indicates to the access network entity 300 how to prioritize between traffic from different ones of the network slices.

As mentioned above, each network slice connected to the access network could use the same QoS concept in isolation; each network slice could use the QoS parameter values appropriate for the user traffic characteristics without having to know or consider the relative priority of the network slice. Hence, according to an embodiment each of the network slice is associated with quality of service parameter values used by the network slices in isolation of each other. In general there may be many QoS parameters, but the relative priority could only be applied to less than all of those such as priority parameters related to scheduling priority and admission control priority.

There could be different examples of network slices. According to an embodiment each network slice represents a dedicated core network. According to an embodiment each network slice is represented by a core network slice or a core network instance.

Reference is now made to FIG. 6 illustrating a method for quality of service differentiation between network slices as performed by the access network entity 300 according to an embodiment.

S202: The access network entity 300 provides service for a PDU flow of one of the network slices.

As disclosed above, the prioritization entity 200 in step S108 provides the access network entity 300 with a relative priority value for the PDU flow. Hence, the access network entity 300 is configured to perform step S204:

S204: The access network entity 300 obtains a relative priority value for the PDU flow from the prioritization entity 200.

Further, each PDU flow is assumed to be associated with a QCI. Hence, the access network entity 300 is configured to perform step S206:

S206: The access network entity 300 obtains a quality of service class identifier for the PDU flow.

The obtained relative priority value and quality of service class identifier are used by the access network entity 300 during packet forwarding as a basis for per packet forwarding treatment (e.g. scheduling weights, admission thresholds, queue management thresholds, link layer protocol configuration, etc.). Hence, the access network entity 300 is configured to perform step S208:

S208: The access network entity 300 prioritizes the PDU flow in relation to other PDU flows for which the access network entity 300 provides service according to the relative priority value and the quality of service class identifier, thereby differentiating the quality of service for the network slices.

Embodiments relating to further details of quality of service differentiation between network slices as performed by the access network entity 300 will now be disclosed.

There may be different opportunities for when the access network entity 300 prioritizes the PDU flow. According to an embodiment the prioritizing is performed during packet forwarding of PDUs in the PDU flow. According to an embodiment the prioritizing is performed during admission control of PDUs in the PDU flow. For example, prioritization information related to all connected network slices could be configured by the access network entity 300, e.g. when a network slice is created, when a network slice is deleted, and/or when relevant operator policies for any of the connected network slices are changed.

Figure 7:
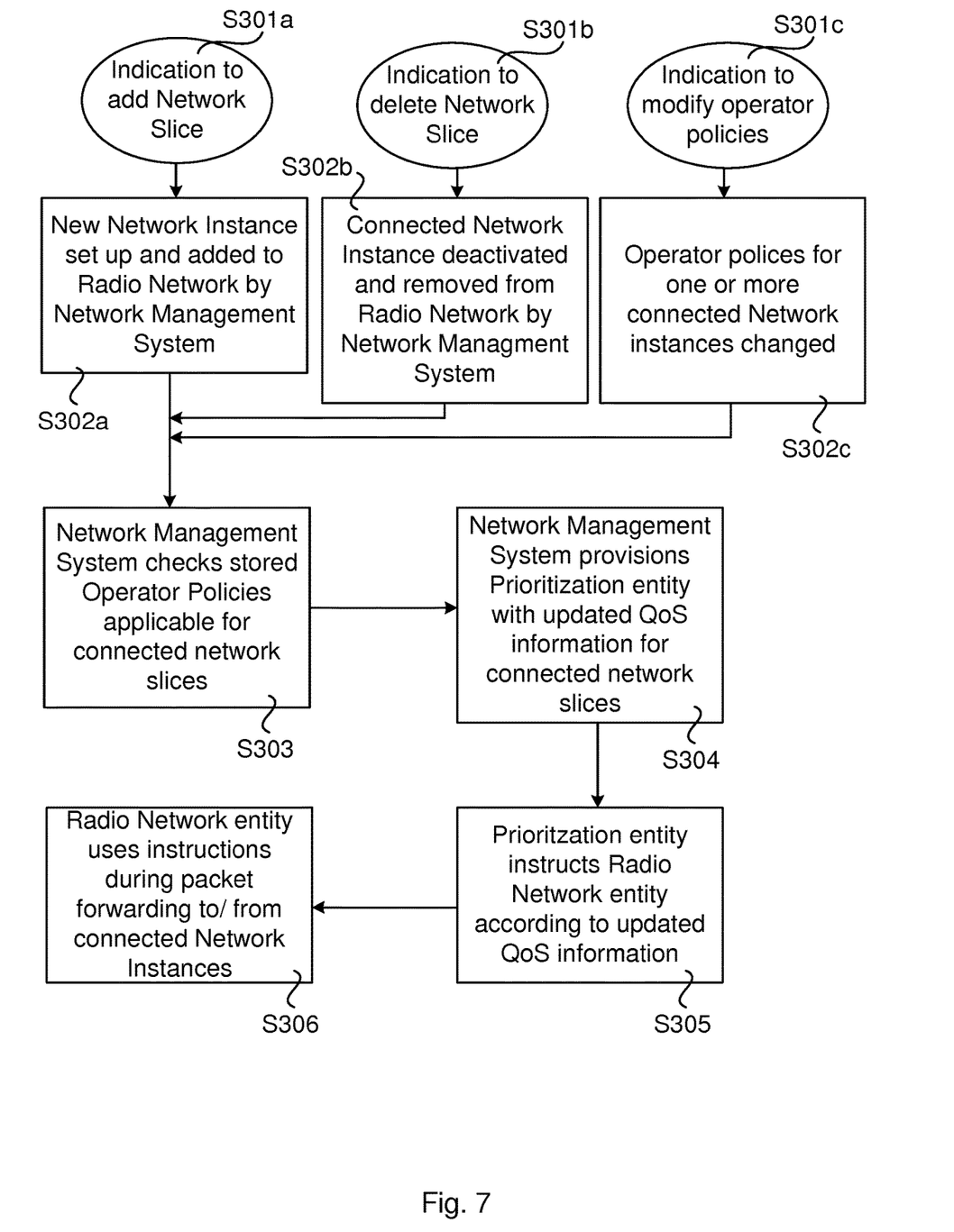

One particular embodiment for quality of service differentiation between network slices based on at least some of the above disclosed embodiments will now be disclosed in detail with reference to the flow chart of FIG. 7.

FIG. 7 represents three scenarios relating to different events in the communications network; steps 301a and 302a relate to a scenario where a new network slice is added; steps 301b and 302b relate to a scenario where an existing network slice is deleted; and steps S301c and S302c relate to a scenario where operator policies are modified.

S301a: An indication that a new network slice is to be added in the core network is provided to the network management system 400. As a result thereof step S302a is entered.

S301b: An indication that an existing network slice is to be deleted from the core network. As a result thereof step S302b is entered.

S301c: An indication that operator polices for one or more connected network instances needs to be modified is provided to the network management system 400. As a result thereof step S302c is entered.

S302a: The network management system 400 sets up a new network instance and adds the new network instance to the access network.

S302b: The network management system 400 deactivates the existing network instance and removes the existing network instance from the access network.

S302c: The network management system 400 changes operator polices for one or more connected network instances.

S303: The network management system 400 checks stored operator policies applicable for the connected network slices based on which of steps S301a-S302c were performed.

S304: The network management system 400 provisions the prioritization entity 200 with updated QoS information for the connected network slices. One way to implement step S304 is to perform step S102.

S305: The prioritization entity 200 instructs the access network entity 300 according to the updated QoS information. One way to implement step S305 is to perform steps S108 and S204.

S306: The access network entity 300 uses the instructions received from the prioritization entity 200 in step S305 during packet forwarding to/from the connected network instances. One way to implement step S306 is to perform step S208.

Figure 8:
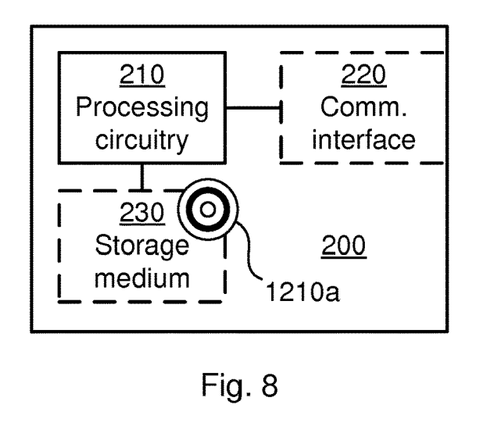
FIG. 8 is a schematic diagram showing functional units of a prioritization entity according to an embodiment.

FIG. 8 schematically illustrates, in terms of a number of functional units, the components of a prioritization entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the prioritization entity 200 to perform a set of operations, or steps, S102-S108, as disclosed above. For example, the storage medium 230 may store the set of operations, and the processing circuitry 210 may be configured to retrieve the set of operations from the storage medium 230 to cause the prioritization entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The prioritization entity 200 may further comprise a communications interface 220 for communications with at least with the access network entity 300 and the network management system 400. As such the communications interface 220 may comprise one or more transmitters and receivers, comprising analogue and digital components.

The processing circuitry 210 controls the general operation of the prioritization entity 200 e.g. by sending data and control signals to the communications interface 220 and the storage medium 230, by receiving data and reports from the communications interface 220, and by retrieving data and instructions from the storage medium 230. Other components, as well as the related functionality, of the prioritization entity 200 are omitted in order not to obscure the concepts presented herein.

Figure 9:
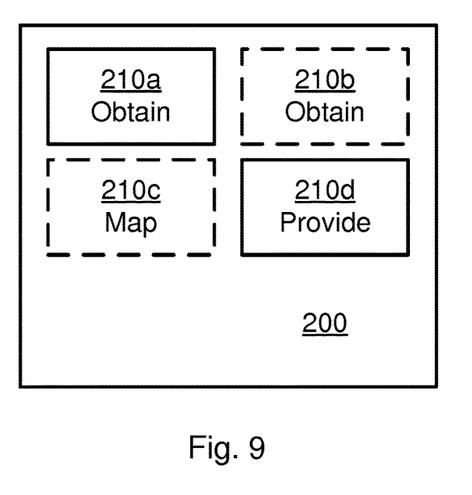
FIG. 9 is a schematic diagram showing functional modules of a prioritization entity according to an embodiment.

FIG. 9 schematically illustrates, in terms of a number of functional modules, the components of a prioritization entity 200 according to an embodiment. The prioritization entity 200 of FIG. 9 comprises a number of functional modules; an obtain module 210a configured to perform step S102, and a provide module 210d configured to perform step S108. The prioritization entity 200 of FIG. 9 may further comprise a number of optional functional modules, such as any of an obtain module 210b configured to perform step S104, and a map module 210c configured to perform step S106. In general terms, each functional module 210a-210d may be implemented in hardware or in software. Preferably, one or more or all functional modules 210a-210d may be implemented by the processing circuitry 210, possibly in cooperation with functional units 220 and/or 230. The processing circuitry 210 may thus be arranged to from the storage medium 230 fetch instructions as provided by a functional module 210a-210d and to execute these instructions, thereby performing any steps of the prioritization entity 200 as disclosed herein.

Figure 10:
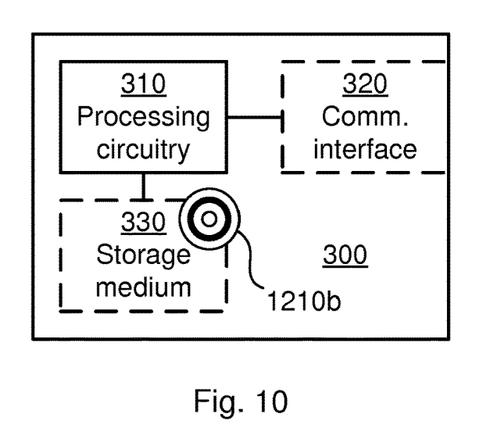
FIG. 10 is a schematic diagram showing functional units of an access network entity according to an embodiment.

FIG. 10 schematically illustrates, in terms of a number of functional units, the components of an access network entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the access network entity 300 to perform a set of operations, or steps, S202-S208, as disclosed above. For example, the storage medium 330 may store the set of operations, and the processing circuitry 310 may be configured to retrieve the set of operations from the storage medium 330 to cause the access network entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The access network entity 300 may further comprise a communications interface 320 for communications at least with the prioritization entity 200. As such the communications interface 320 may comprise one or more transmitters and receivers, comprising analogue and digital components.

The processing circuitry 310 controls the general operation of the access network entity 300 e.g. by sending data and control signals to the communications interface 320 and the storage medium 330, by receiving data and reports from the communications interface 320, and by retrieving data and instructions from the storage medium 330. Other components, as well as the related functionality, of the access network entity 300 are omitted in order not to obscure the concepts presented herein.

Figure 11:
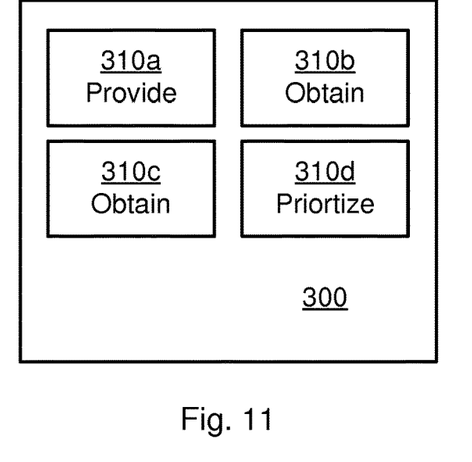
FIG. 11 is a schematic diagram showing functional modules of an access network entity according to an embodiment.

FIG. 11 schematically illustrates, in terms of a number of functional modules, the components of an access network entity 300 according to an embodiment. The access network entity 300 of FIG. 11 comprises a number of functional modules; a provide module 310a configured to perform step S202, an obtain module 310b configured to perform step S204, an obtain module 310c configured to perform step S206, and a prioritize module 310d configured to perform step S208. The access network entity 300 of FIG. 11 may further comprises a number of optional functional modules. In general terms, each functional module 310a-310d may be implemented in hardware or in software. Preferably, one or more or all functional modules 310a-310d may be implemented by the processing circuitry 310, possibly in cooperation with functional units 320 and/or 330. The processing circuitry 310 may thus be arranged to from the storage medium 330 fetch instructions as provided by a functional module 310a-310d and to execute these instructions, thereby performing any steps of the access network entity 300 as disclosed herein.

The prioritization entity 200 and/or the access network entity 300 may be provided as a standalone device or as a part of at least one further device. For example, the prioritization entity 200 and/or access network entity 300 may be provided in a node of the access network. For example, the prioritization entity 200 may be provided in a node of the core network. Alternatively, functionality of the prioritization entity 200 and/or the access network entity 300 may be distributed between at least two devices, or nodes. These at least two nodes, or devices, may, for the prioritization entity 200, either be part of the same network part (such as the access network or the core network) or may be spread between at least two such network parts. In general terms, instructions that are required to be performed in real time may be performed in a device, or node, operatively closer to the served wireless devices than instructions that are not required to be performed in real time.

Thus, a first portion of the instructions performed by the prioritization entity 200 and/or the access network entity 300 may be executed in a first device, and a second portion of the of the instructions performed by the prioritization entity 200 and/or the access network entity 300 may be executed in a second device; the herein disclosed embodiments are not limited to any particular number of devices on which the instructions performed by the prioritization entity 200 and/or the access network entity 300 may be executed. Hence, the methods according to the herein disclosed embodiments are suitable to be performed by a prioritization entity 200 and/or an access network entity 300 residing in a cloud computational environment. Therefore, although a single processing circuitry 210, 310 is illustrated in FIGS. 8 and 10 the processing circuitry 210, 310 may be distributed among a plurality of devices, or nodes. The same applies to the functional modules 210a-210d, 310a-310d of FIGS. 9 and 11 and the computer programs 1220a, 1220b of FIG. 12 (see below).

Figure 12:
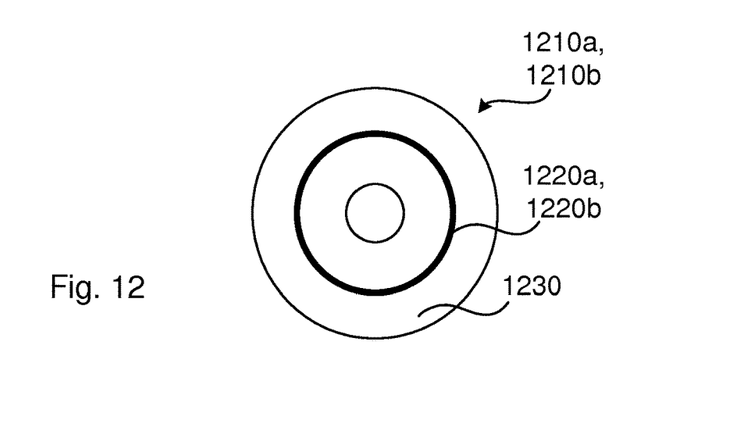
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the prioritization entity 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the access network entity 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for quality of service differentiation between network slices, the method comprising a prioritization entity:
   obtaining relative priority values for the network slices from a network entity;
   obtaining information of which one of the network slices the PDU flows belongs to during: setup of a bearer for the PDU flow, setup of tunneling of the bearer, setup of a PDU session, or provisioning of the bearer;
   mapping the relative priority value for the network slice to the PDU flow based on the information; and
   providing an access network entity with a relative priority value for a protocol data unit (PDU) flow as given by the relative priority value for the network slice used by that PDU flow, thereby causing differentiation of the quality of service for the network slices.

2. The method of claim 1, wherein the relative priority values are based on network operator policies applicable to those of the network slices that are available.

3. The method of claim 1, wherein the relative priority values are obtained from the network entity as quality of service information for the network slices.

4. The method of claim 1, wherein the relative priority value indicates to the access network entity how to prioritize between traffic from different ones of the network slices.

5. The method of claim 1, wherein each of the network slice is associated with quality of service parameter values used by the network slices in isolation of each other.

6. The method of claim 1, wherein each network slice represents a dedicated core network.

7. The method of claim 1, wherein each network slice is represented by a core network slice or a core network instance.

8. The method of claim 1, wherein the network entity is a network management system or a Policy Control plane Function (PCF) via a Core network Control Function (CCF).

9. A method for quality of service differentiation between network slices, the method comprising an access network entity:
   providing service for a protocol data unit (PDU) flow of one of the network slices;
   obtaining a relative priority value for the PDU flow from a prioritization entity;
   obtaining a quality of service class identifier for the PDU flow; and
   prioritizing the PDU flow in relation to other PDU flows for which the access network entity provides service according to the relative priority value and the quality of service class identifier, thereby differentiating the quality of service for the network slices;
   wherein the relative priority value is based on information that was obtained during setup of a bearer for the PDU flow, setup of tunneling of the bearer, setup of a PDU session, or provisioning of the bearer, and indicates the PDU flows belongs to the one of the network slices, and the relative priority value for the one of the network slices being mapped to the PDU flow based on the information.

10. The method of claim 9, wherein the prioritizing is performed during packet forwarding of PDUs in the PDU flow.

11. The method of claim 10, wherein the prioritizing is performed during admission control of PDUs in the PDU flow.

12. A prioritization entity for quality of service differentiation between network slices, the prioritization entity comprising:
   processing circuitry;
   memory containing instructions executable by the processing circuitry whereby the prioritization entity is operative to:
      obtain relative priority values for the network slices from a network entity;
      obtain information of which one of the network slices the PDU flows belongs to during: setup of a bearer for the PDU flow, setup of tunneling of the bearer, setup of a PDU session, or provisioning of the bearer;
      map the relative priority value for the network slice to the PDU flow based on the information; and
      provide an access network entity with a relative priority value for a protocol data unit (PDU) flow as given by the relative priority value for the network slice used by that PDU flow, thereby causing differentiation of the quality of service for the network slices.

13. An access network entity for quality of service differentiation between network slices, the access network entity comprising:
   processing circuitry;
   memory containing instructions executable by the processing circuitry whereby the access network entity is operative to:
      provide service for a protocol data unit (PDU) flow of one of the network slices;
      obtain a relative priority value for the PDU flow from a prioritization entity;
      obtain a quality of service class identifier for the PDU flow; and
      prioritize the PDU flow in relation to other PDU flows for which the access network entity provides service according to the relative priority value and the quality of service class identifier, thereby differentiating the quality of service for the network slices;

wherein the relative priority value is based on information that was obtained during setup of a bearer for the PDU flow, setup of tunneling of the bearer, setup of a PDU session, or provisioning of the bearer, and indicates the PDU flows belongs to the one of the network slices, and the relative priority value for the one of the network slices being mapped to the PDU flow based on the information.

* * * * *